INVENTORS
M.W. OGLESBY
D.E. LUPFER
BY Hudson F. Young
ATTORNEYS

United States Patent Office 3,269,921
Patented August 30, 1966

3,269,921
COMPUTING AND CONTROLLING THE ENTHALPY OF A PROCESS STREAM
Minor W. Oglesby and Dale E. Lupfer, Bartlesville, Okla., assignors to Phillips Petroleum Company, a corporation of Delaware
Filed July 3, 1961, Ser. No. 125,025
5 Claims. (Cl. 203—2)

This application is a continuation-in-part of our co-pending application Serial No. 80,453, filed January 3, 1961.

This invention relates to a method and apparatus for computing the enthalpy of a process stream, such as the feed to a fractionation column. In another aspect, it relates to a method and apparatus for computing and controlling the enthalpy of a process stream, such as the feed to a fractionation column where the feed is first indirectly heat exchanged with the bottoms product of the column and then indirectly heat exchanged with steam prior to the introduction of such feed into the column.

In various industrial processes it is a common practice to heat a process stream by indirectly heat exchanging it with a liquid heat exchange medium and a condensable vaporous heat exchange medium. For example, in the case of fractionation or distillation columns of many chemical and petroleum processes the feed introduced into the column is first indirectly heat exchanged with the bottoms product of the column and then indirectly heat exchanged with steam. In these processes it becomes necessary for efficient and economical operation to maintain the enthalpy or heat content of the thus heated process stream at a constant value for a given operation.

The conventional method of controlling the heat content of such a process stream is to measure the temperature of the heated process stream and accordingly control the flow of the heat exchange medium in order to hold the temperature of the process stream constant. While this may be satisfactory in many operations, for example where the heated process stream is in the liquid state or its composition is substantially constant, in many other operations such temperature control is unsatisfactory as a means for controlling feed enthalpy. Where the feed rate of the process stream changes, or where the process stream must be heated to its bubble point or must be partially vaporized, any variation in feed flow, initial feed enthalpy, steam, steam supply conditions, or bottoms product flow may give rise to substantial changes in feed enthalpy with very little or no change in feed temperature. For example, certain fractionation processes can be carried out with maximum efficiency when a preselected fraction of the feed mixture is introduced into the column in the vapor state. In particular, the capacity of the column generally exhibits a maximum for any particular feed mixture when some preselected fraction of the feed is vaporized prior to being introduced into the column. Again, in such fractionation processes temperature measurement of a partially vaporized stream is not an accurate determination of feed enthalpy. Thus, there has risen a need for a more efficient and responsive method and apparatus for computing and controlling the enthalpy of a process stream, such as the feed to a fractionation column, which feed is first indirectly heat exchanged with the bottoms product of the column and then indirectly heat exchanged with steam prior to the entry of such heated feed to the column.

Accordingly, an object of this invention is to provide an improved method and apparatus for computing the enthalpy of a process stream. Another object is to provide an improved method and apparatus for computing and controlling the enthalpy of a process stream, such as the feed to a fractionator, in a fast, responsive manner over a wide range of flow rates and notwithstanding changes in the physical state of the heated feed, and flow disturbances in the heat exchange medium. Other objects and advantages of this invention will become apparent to those skilled in the art from the following discussion, appended claims, and drawing in which:

FIGURE 1 schematically illustrates in the form of a flow sheet a fractionation process having incorporated therein one embodiment of the enthalpy computing and controlling means of this invention;

Briefly stated, we have discovered that the enthalpy of a process stream which is indirectly heat exchanged with heat exchange medium can be computed by automatically determining and summing the initial enthalpy of the process stream and the enthalpy given to said process stream by said heat exchange medium, and that the thus computed enthalpy of the heat process stream can be used for monitoring purposes or to automatically maintain the enthalpy of the process stream at a constant value by accordingly manipulating the flow of the heat exchange medium. For example, in the case of a fractionation process, where a liquid feed stream is indirectly heat exchanged with the bottoms product of the fractionation column in an economizer exchanger and then with steam in a preheater, we propose to compute and control the enthalpy of the feed introduced into the fractionation column by automatically computing the initial enthalpy of the feed, the enthalpy given to the feed in the economizer exchanger, and the enthalpy given to the feed in the feed preheater, adding these enthalpy values to give the total enthalpy of the feed with respect to a reference temperature, and accordingly manipulating the flow of steam to said preheater to maintain the enthalpy of the feed at a constant value.

Although this invention is particularly adapted to computing and controlling the enthalpy of feed used in a fractionation process, and this invention will be described hereinbelow as applied thereto, it should be understood that this invention is not to be limited unduly thereto, since it is applicable wherever a process stream is heated by successive indirect heat exchange steps, e.g., crystallization, polymerization, cracking, and alkylation, and other process where temperature control is necessary.

Figure 1:
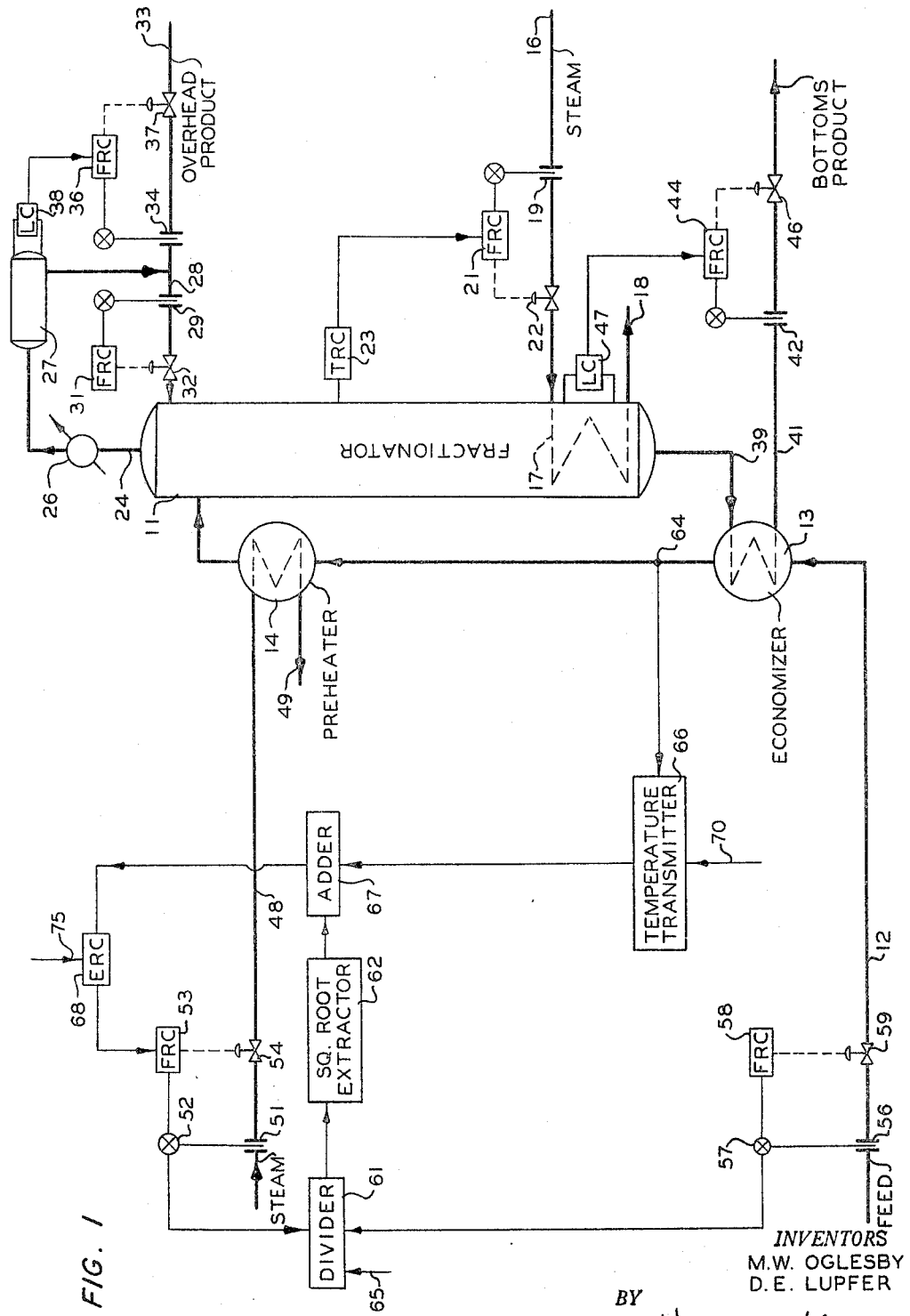

Referring now to the drawing, and initially to FIGURE 1, a conventional fractionation process is illustrated with the novel enthalpy computing and controlling feature of this invention associated therewith. A feed mixture to be fractionated is introduced into fractionation colum 11 through a feed line 12, having an indirect heat exchanger or economizer 13 and an indirect heat exchanger or preheater 14 therein. Heat is supplied to the kettle of column 11 by circulation of steam or other heat medium from supply line 16 through a reboiler coil 17, the spent exchange medium being withdrawn from the kettle portion of the column via line 18. The flow rate of the steam in line 16 can be set either manually or by means of flow control valve 22, differential pressure orifice 19, and flow rate controller 21, which control system can be cascaded by a temperature recorder controller 23, this control system being conventional.

Vapors are removed from the top of column 11 through overhead line 24, cooled by cooler 26, and passed to an accumulator 27. A portion of the resulting condensate in accumulator 27 is returned to column 11 is reflux through line 28, the flow rate of the reflux being set at a predetermined rate either manually or by means of flow rate control valve 32, differential pressure orifice 29, and flow rate controller 31, this control system being conventional. The remainder of the condensate in accumulator 27 is removed as overhead product via line 33, the flow thereof regulated by flow control valve 37, orifice 34, and flow rate controller 36; the set point of the latter can be manipulated by liquid level controller 38 on accumulator 27. The bottoms product is withdrawn via line 39, heat exchanged with the feed in economizer 13, and recovered via line 41, the flow of the bottoms product being regulated by flow control valve 46, orifice 42, and flow rate controller 44, the set point of the latter being manipulated by liquid level controller 47.

Steam or other condensable, vaporous heat exchange medium is supplied via line 48 to preheater 14, the resulting condensate being withdrawn via line 49. The rate of flow of steam in line 48 is controlled by means of flow rate control valve 54, differential pressure orifice 51, and flow rate controller 53. The flow of feed in line 12 is similarly controlled by means of flow rate control valve 59, differential pressure orifice 56, and flow rate controller 58.

Thus far, there has been described a conventional fractionation process, which by itself does not constitute the subject invention. In such a process, the feed is first heated in the economizer by indirect heat exchange with the bottoms product of the fractionation column; no attempt is made to control the heat given up by the bottoms product in the economizer, the amount of such heat given up depending on the temperature and flow rate of the bottoms product and the temperature and flow rate of the feed. In the particular fractionation process described and shown in FIGURE 1, the feed heated in the economizer is not vaporized but remains in the liquid state. The heated liquid feed is then passed to the preheater and indirectly heat exchanged with steam. The heated feed is then introduced into the fractionation column at its bubble point temperature, in a partially vaporized state, as saturated vapor, or even as superheated vapor. The enthalpy computing and controlling features of this invention will now be described as applied to such process.

The enthalpy computing means illustrated in FIGURE 1 is capable of solving the following equation:

$$H_T = C_{pF}(T_1 - T_0) + F_S/F_F)h_S$$

where $C_{pF}(T_1-T_0)$ = enthalpy given to the feed in the economizer exchanger plus initial enthalpy of feed above a reference temperature (B.t.u./lb. of feed)
$(F_S/F_F)h_S$ = enthalpy given to the feed in the feed preheater (B.t.u./lb. of feed)
$C_{pF}$ = average specific heat of feed (B.t.u./lb. × °F.)
$T_1$ = temperature of feed at exit of economizer exchanger (° F.)
$T_0$ = reference temperature (° F.)
$F_S$ = steam flow (lb./hr.)
$F_F$ = feed flow (lb./hr.)
$h_S$ = difference in enthalpy of steam entering preheater and the condensate (B.t.u./lb. of steam)
$H_T$ = total enthalpy of feed leaving preheater above reference temperature $T_0$, (B.t.u./lb.)

Referring again to FIGURE 1, a signal proportional to the square of the flow rate of feed, $F_F$, is established by a differential pressure transducer 57 which is connected across orifice 56 in feed line 12. The output signal of differential pressure transducer 57 is transmitted to a signal divider 61, such as a force bridge. A signal proportional to the square of the rate of flow of steam, $F_S$, is established by a differential pressure transducer 52 which is connected across orifice 51 in steam supply line 48, and this signal is also applied to signal divider 61. The signal divider 61 can be any instrument adapted to divide one signal by another and supply a signal representing the quotient. A signal 65 is supplied to divider 61 as a constant, $(h_S)^2$, proportional to the square of the enthalpy per pound of steam. The output signal of divider 61 is proportional to the ratio of the steam and feed flows squared multiplied by the steam enthalpy squared, and this signal is transmitted to a square root extractor 62, such as a force bridge, which extracts the square root of the signal supplied from the divider 61. The output signal from square root extractor 62, proportional to $(F_S/F_F)h_S$, is the increase in enthalpy of the feed supplied by the steam in the feed preheater.

A temperature transducer 64 is positioned in feed line 12, downstream of economizer 13 where the heated feed is in the liquid state. The temperature of the heated feed can be used to calculate the enthalpy of the feed at that point. Transducer 64 is connected to temperature transmitter 66 which provides an output signal proportional to $(T_1-T_0)C_{pF}$, where $T_0$ is the reference temperature and the lower limit of the temperature transmitter, and $C_{pF}$ is supplied as a constant by signal line 70. The output from said transmitter 66 is transmitted to an adder or computing relay 67. Adder 67 is adapted to sum the outputs from square root extractor 62 and temperature transmitter 66, and produce an output signal equal to $H_T$, the measured feed enthalpy above the reference temperature. The output of the adder 67 can be recorded by a recorder (not shown) and used for monitoring purposes only, or this output can be conveyed to a suitable enthalpy recorder controller 68 to which is supplied the desired feed enthalpy value as set point signal 75. The output of enthalpy recorder controller 68 then manipulates the set point of steam flow recorder controller 53 so as to maintain the enthalpy of the feed introduced into the fractionation column 11 at a constant value.

The above-described enthalpy computing and controlling features of this invention provide an accurate measure and control of the heat content of the feed regardless of whether it is subcooled, at its bubble point, partially vaporized, at its dew point, or superheated, irrespective of disturbances in the feed rate, bottoms product rate, and other fractionator variables.

The enthalpy computing and controlling embodiment of this invention discussed in conjunction with FIGURE 1 is particularly adapted, as stated above, where the feed leaving the economizer is not vaporized but is still in its liquid state. However, in many cases the feed at the exit of the economizer will be partially vaporized. As such, its temperature will not be an indication of the enthalpy of the feed at that point in the process. A second embodiment of this invention will now be described, with reference to FIGURE 2, where the enthalpy computing and controlling feature of this invention is modified to compute the heat transferred to the feed by the bottoms product in the economizer.

Figure 2:
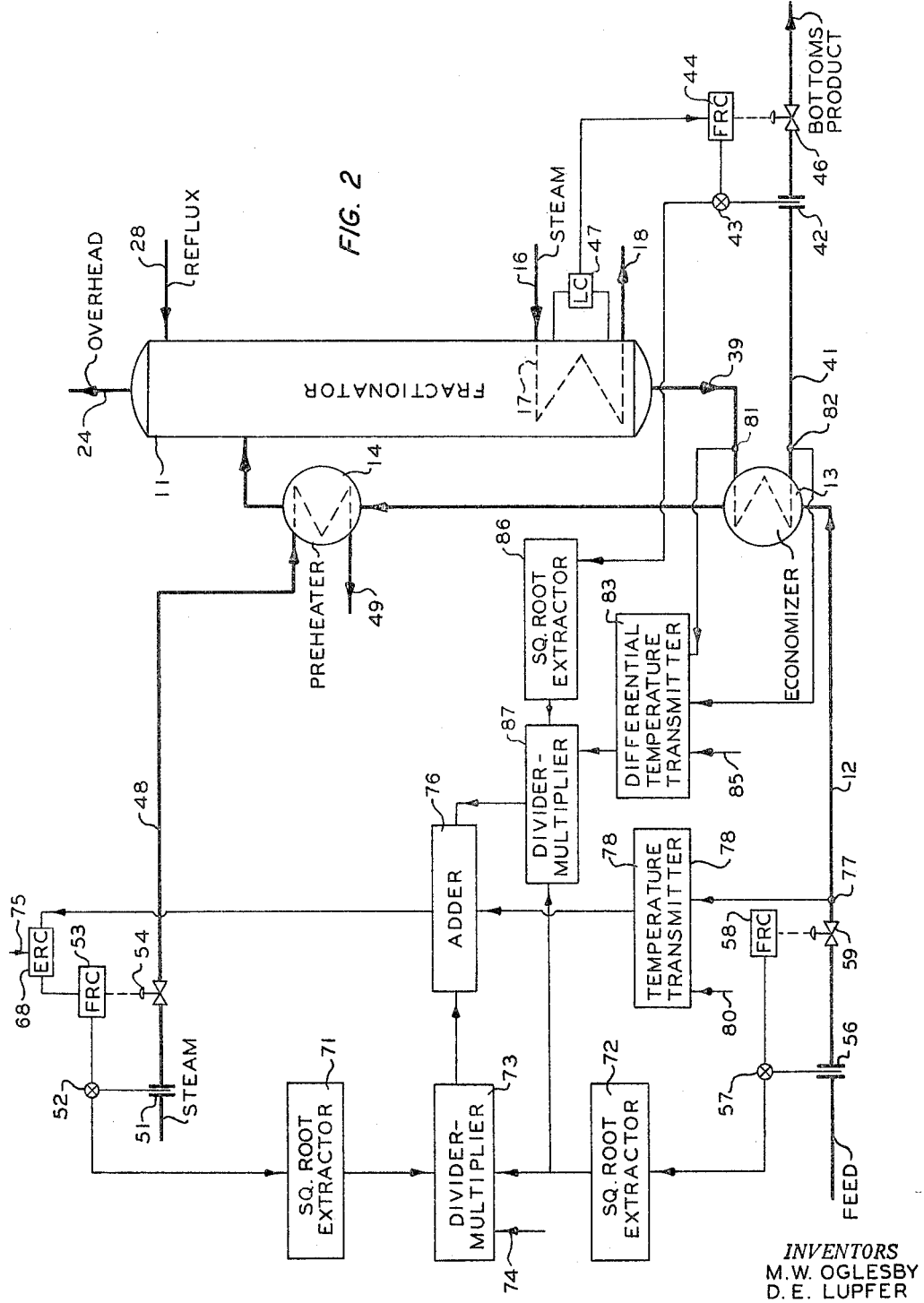
FIGURE 2 is a view similar to FIGURE 1 illustrating another embodiment of this invention.

The embodiment illustrated in FIGURE 2 is capable of solving the following equation.

$$H_T = C_{pF}(T_1-T_0) + (F_S/F_F)(h_s) + (F_B/F_F)(C_{Bp})(T_{B1}-T_{B2})$$

where $H_T$ = total enthalpy of the feed referenced to $T_0$ (B.t.u./lb. of feed)
$C_{pF}(T_1-T_0)$ = initial enthalpy of feed (B.t.u. of feed)
$(F_B/F_F)C_{pB}(T_{B1}-T_{B2})$ = enthalpy given to the feed in the economizer exchanger (B.t.u./lb. of feed)
$(F_S/F_F)h_s$ = enthalpy given to the feed in the feed preheater (B.t.u./lb. of feed)

$C_{pF}$ = average specific heat of feed (B.t.u./lb. × °F.)
$T_i$ = temperature of feed before entering economizer exchanger (°F.)
$F_S$ = steam flow (lb./hr.)
$F_F$ = feed flow (lb./hr.)
$F_B$ = bottoms product flow (lb./hr.)
$h_s$ = difference in enthalpy of steam entering preheater and the condensate (B.t.u./lb. of steam)
$C_{pB}$ = average specific heat of bottoms product (B.t.u./lb. × °F.)
$T_{B1}$ = temperature of bottoms product entering economizer exchanger (°F.)
$T_{B2}$ = temperature of bottoms product leaving economizer exchanger (°F.)
$T_0$ = arbitrary reference temperature used to compute $H_T$ (°F.)

In FIGURE 2, the same fractionation system as FIGURE 1 is illustrated, except that in the interest of brevity the details of the overhead product recovery and reboiler steam control have not been shown.

In FIGURE 2, the signals proportional to the squares of the flow rates of steam and feed, as established by differential pressure transducers 52 and 57, respectively, are transmitted to square root extractors 71 and 72, respectively, these instruments providing the same operation as square root extractor 62 of FIGURE 1. The output signal from square root extractor 71 is proportional to steam flow, $F_S$, and the output signal from square root extractor 72 is proportional to the feed flow, $F_F$, and these outputs are transmitted to divider-multiplier 73, which is adapted to divide the signal from square root extractor 71 by the output signal of square root extractor 72 and multiply the quotient by a constant introduced by signal line 74 equal to the enthalpy, $h_s$, per pound of steam in preheater 14. The resulting signal from divider-multiplier 73, proportional to $(F_S/F_F)h_s$, is transmitted to adder or computing relay 76.

A temperature transducer 77 is positioned in feed line 12 and it is connected to a temperature transmitter 78. A signal 80, equal to the constant $C_{pF}$ is also fed into transmitter 78. Temperature transmitter 78 produces an output signal $-C_{pF}(T_i-T_o)$ which is proportional to the deviation of the initial enthalpy of the feed from an arbitrary reference, for example a reference temperature above that of the feed temperature in order that the output from this instrument can be subtracted in adder 76.

The differential or drop in temperature of the bottoms product across economizer 13 is measured by means of temperature transducers 81 and 82, placed in bottoms product lines 39 and 41, respectively, these temperature transducers being connected in series and adapted to providing a signal to differential temperature transmitter 83 proportional to the drop in temperature of the bottoms product in the economizer. A signal 85 proportional to $C_{pB}$ is also fed into transmitter 83.

An output signal from differential pressure transducer 43, connected across orifice 42 in bottoms product line 41, is transmitted to square root extractor 86, which can be like square root extractor 62 of FIGURE 1, to provide a signal proportional to the rate of flow of bottoms product, $F_B$, through economizer 13.

The output signals from differential temperature transmitter 83 and square root extractor 86, as well as square root extractor 72, are transmitted to divider-multiplier 87, an instrument like divider-multiplier 73, where the signal from square root extractor 86, $F_B$, is divided by the signal from square root extractor 72, $F_F$, and this quotient multiplied by the enthalpy given up by the bottoms product, $C_{pB}(T_{B1}-T_{B2})$. The output from divider-multiplier 87 is then transmitted to adder 76 where it is added to the signal from temperature transmitter 78, $-C_{pF}(T_i-T_o)$, and the signal from divider-multiplier 73, $(F_S/F_F)h_s$. The output from adder or enthalpy computer 76 is proportional to the total enthalpy of the feed above the chosen reference temperature. This output, like that of adder 67 of FIG. 1, can be supplied to enthalpy recorder controller 68, the output of which may manipulate the set point of flow recorder controller 53 in steam supply line 48, thereby maintaining the enthalpy of the feed introduced into the fractionation column 11 at a constant value.

Figure 3:
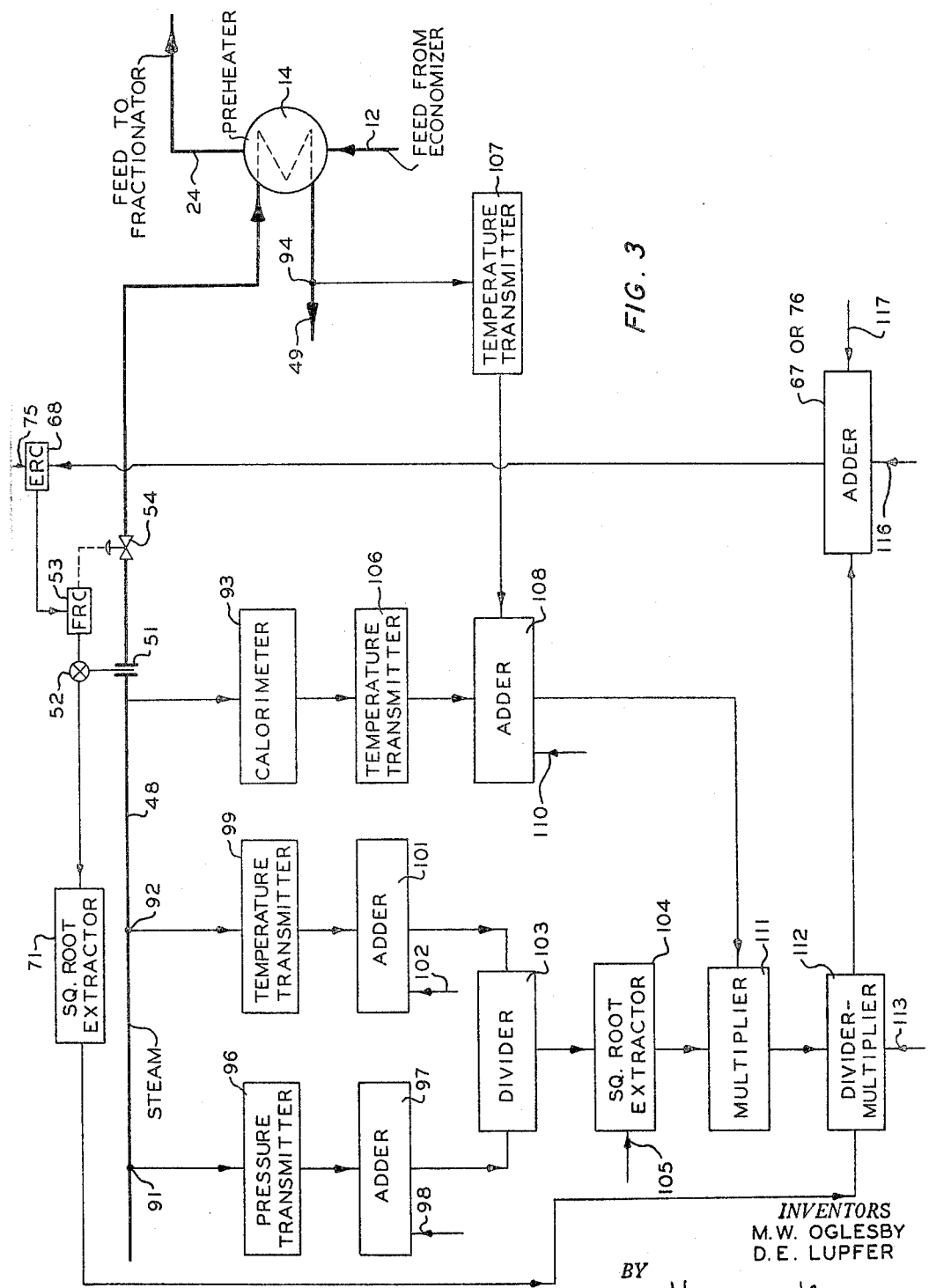
FIGURE 3 is a view of a modification of part of either FIGURE 1 or 2, illustrating a further embodiment of this invention.

In the discussion of the embodiments of both FIGURES 1 and 2, the enthalpy given up by each pound of steam in preheater 13 was assumed to be a constant, $h_s$. In the third embodiment of this invention, as illustrated in FIGURE 3, the enthalpy of the steam is not assumed to be a constant, but rather a continuous measurement is made. This modification of the steam enthalpy computation can be used in either of the embodiments of FIGURES 1 and 2, and for purposes of brevity we have illustrated in FIGURE 3 only this particular modification.

Referring now to FIGURE 3, steam supply line 48 is provided with a pressure transducer 91, temperature transducer 92, and a throttling calorimeter 93, the latter being provided internally with a temperature sensing element (not shown). In addition, the steam condensate line 49 can be provided with a temperature transducer 94 in those cases where it is desired to actually compute the enthalpy of the condensate rather than subtract it as a constant in the steam enthalpy computation.

The pressure sensed by pressure transducer 91 is transmitted to pressure transmitter 96, which in turn produces an output proportional to the pressure in steam supply line 48. This output is then transmitted to an adder or computing relay 97 where it is added to a signal 98 proportional to atmospheric pressure. The sum of these signals is multiplied by a gain proportional to a ratio which represents $144/\mu R$, where $\mu$ is the correction factor for deviation from ideal gas and R is the gas constant.

The temperature in degrees Fahrenheit is measured by temperature transducer 92 in steam supply line 48 is transmitted by temperature transmitter 99 to adder 101 where it is added to an external signal 102 proportional to the number 460, so as to enable adder 101 to transmit an output signal proportional to the absolute temperature in degrees Rankine. The output signals from adders 97 and 101 are transmitted to divider 103, which can be a force bridge. Divider 103 combines the signals from adders 97 and 101 to produce an output signal which is proportional to $$144P/\mu RT = \rho$$

wherein $P$ = absolute pressure in pounds per square inch
$T$ = absolute temperature in degrees Rankine
$\rho$ = density of steam The output signal from divider 103 is then transmitted to square root extractor 104, which produces an output signal proportional to $K_s\sqrt{\rho}$, where $K_s$ is a constant supplied by input 105; $K_s$ is determined by the orifice coefficient, size of steam line 48, and size of orifice 51.

Since the steam is throttled in calorimeter 93 to atmospheric pressure, the measured temperature $T_c$, can be used to determine the enthalpy according to the equation: enthalpy = 1150.4 plus $C_p$ ($T_c$ minus 212), as long as this temperature is above saturation temperature for atmospheric pressure. Divider 108 is adapted to modify the signal fed by transmitter 106 by subtracting an amount proportional to the number 212 and multiplying the result by a constant which represents $C_p$, introduced via line 110, the specific heat of superheated steam at constant pressure in the operating range. Divider 108 adds a signal proportional to the number 1150.4 and subtracts a signal from temperature transmitter 107, which may be a constant which is determined to be the average heat content of the condensate removed from preheater 13 through pipe 49 or may be a signal transmitted by transmitter 107 which is proportional to the temperature measured by temperature sensing element 94 multiplied by a factor to convert to enthalpy of the condensate. Thus, the signal fed by multiplier 111 to multiplier 112 is equal to $K_s\sqrt{\rho(h_s)}$. The output from multiplier 111 is transmitted to divider-multiplier 112 where it is divided by signal 113 proportional to feed flow and the resulting quotient is multiplied by the output $\sqrt{\Delta P}$ from square root extractor 71. Divider-multiplier 112 transmits an output signal $K_s\sqrt{\rho \Delta P}/F_F(h_s)$ equal to $F_s h_s/F_F$ to adder 67 (FIGURE 1) or adder 76 (FIGURE 2) proportional to the enthalpy given up in preheater 14. This output signal is added to signals 117 and 116 which are proportional to initial feed enthalpy and the enthalpy given up in economizer 13, as determined by the embodiments of FIGURES 1 or 2. The output signal from the adder 67 or 76 in FIGURE 3 is then used as before in maintaining the feed enthalpy constant.

In describing the invention thus far, the computation of the enthalpy of the heated process stream is accurate and satisfactory where changes in feed temperature, bottoms product flow, and/or bottoms product temperature are relatively small. However, where these are relatively large and material, it will be necessary and desirable for accurate computation of the enthalpy of the heated process stream to take into account or compensate for the dead time and exponential response of the process stream being heated. This feature of the invention will now be described.

Dead time is the time elapsing between the initiation of a process change and the detection (or manifestation) of the effect of the change at another point in the process system.

To illustrate dead time, if the temperature of the initial feed stream 12 in FIGURE 2 at point 77 should increase by 10° F., the computer will instantly compute an increased enthalpy for the heated feed stream at the outlet of preheater 14. Actually, however, the warmer feed at point 77 does not arrive at the outlet of preheater 14 until the elapse of an amount of time equal to the dead time. Thus, the temperature signal from transducer 77 should be delayed in its transmission to adder 76 by an amount of time equal to this dead time. The adder 76 thus receives the increased temperature signal at the same time that the warmer feed arrives at the outlet by preheater 14. Similarly, when the temperature or flow rate of bottoms product 39 changes appreciably, the signal from divider-multiplier 87 should be delayed in its transmission to adder 76 by an amount of time equal to the dead time of the process stream in passing from enonomizer 13 to the outlet of preheater 14.

To illustrate exponential response, a sharp increase in the temperature of the feed stream of point 77 will be smoothed to a gradual increase in temperature by the time this warmer feed reaches the outlet of preheater 14 due to mixing of the warmer feed with relatively cooler feed in the pipe transporting the feed stream. In more technical terms, a step change in temperature is smoothed to an exponential change or response. Thus, even after the temperature signal from transducer 77 has been delayed for dead time, the signal should be modified so that the adder 76 computes a gradually or exponentially increasing enthalpy at the outlet of preheater 14 rather than a sharp increase or step increase in enthalpy introduced at point 77. Similarly, the signal from divider-multiplier 87 should be modified for exponential response.

Figure 4:
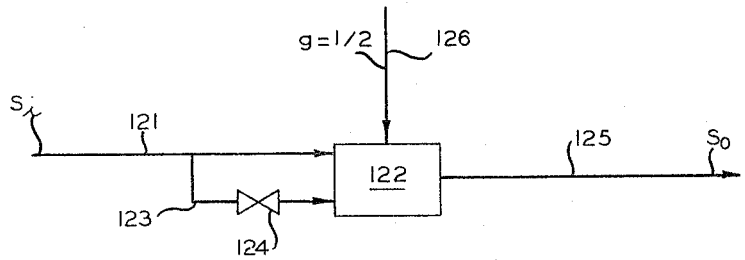
FIGURE 4 is a schematic view of a first order dead time simulator.
Figure 5:
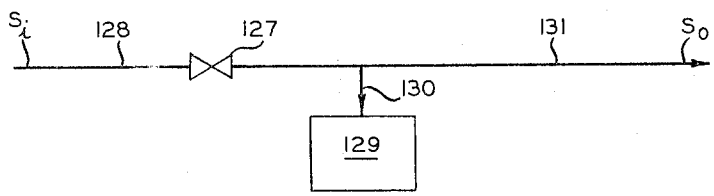
FIGURE 5 is a schematic view of a first order exponential lag.
Figure 6:
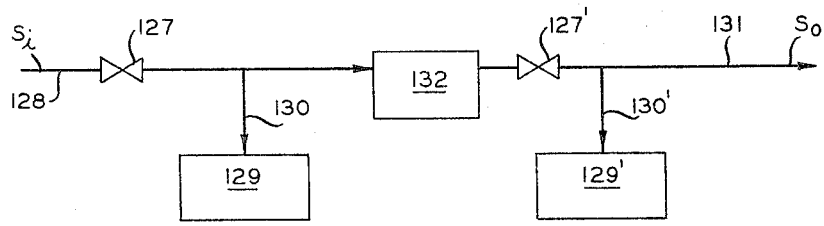
FIGURE 6 is a second order non-interacting exponential lag.

In FIGURES 4, 5, and 6 we have illustrated signal delay means to compensate for these dead times and exponential responses.

Compensation for dead time may be made by first, second, third, and $n$th order dead time simulators, depending upon process dynamics of the system. A first order dead time simulator, of a pneumatic type, is shown in FIGURE 4. An input signal $S_i$ is transmitted via conduit 12 1to a conventional pneumatic computing relay 122, such as a Foxboro adding relay Model M56–1 shown in Bulletin 37–A–57A of the Foxboro Co. This relay is capable of solving the equation:

$$\text{output} = -g(C) + B$$

where $g$ is the adjustable gain of the relay, and C and B are input variables. Input signal $S_i$ is also transmitted to relay 122 via conduit 123 having a restrictor such as a valve 124 therein. The transfer function for the pneumatic circuit of FIGURE 4, in terms of the output signal $S_o$ divided by the input signal $S_i$ is found by the equation:

$$\frac{S_o}{S_i} = \frac{-T_2S - 1 + 2}{2(T_2S + 1)} = -\frac{1}{2}\left(\frac{T_2S - 1}{T_2S + 1}\right)$$

where S is the LaPlace operator and $T_2$ is the time constant equal to the product of the resistance times the capacitance. The resistance can be determined by measuring the pressure drop across the restrictor 124, and dividing said pressure drop by the quantity of flow through the restrictor. The capacitance is the volume of bellows B in computing relay 122.

An example of a second order dead time simulator is described and claimed in copending application Serial No. 95,089, filed March 13, 1961, by Minor W. Oglesby et al. Higher order dead time simulators are made by placing first and second order simulators in series, for example, a fifth order simulator can be made by putting in series two second order simulators and one first order simulator.

Compensation for exponential response can be made by use of first, second, third, and $n$th order interacting or non-interacting pneumatic lags, depending on process dynamics of the system. A first order exponential lag of the pneumatic type is shown in FIGURE 5. It consists of a restrictor valve 127 in the signal line 128 and a capacitor or tank 129. A second order exponential lag can be made like that shown in FIGURE 6, by combining in series two first order lags. The lag is made non-interacting by inserting a 1:1 isolating relay 132, for example a Moore Volume Booster, Model 61, between the lags. An $n$th order non-interacting lag can be made by combining in series $n$ first order lags, with a 1:1 isolating relay inserted between each first order lag.

Any one of the above-described means for compensating for exponential response can be combined in series with any of the above-described dead time simulators, to first smooth out the signal and then delay it for dead time. One combination of these means can be inserted in the signal transmission line from temperature transmitter 78 to adder 78 of FIGURE 2, and another can be inserted in the signal transmission line from divider-multiplier 87 to adder 76 of FIGURE 2. The transfer function of each of these signal delay combinations can be expressed by the quotient:

$$\frac{\epsilon^{-ST_D}}{(\tau S + 1)^n}$$

where $\epsilon^{-ST_D}$ is the LaPlace form for dead time, $T_D$ is the dead time in minutes, $1/(\tau S + 1)^n$ is the LaPlace form for a multi-order non-interacting lag, $\tau$ is the time constant of the individual first order lag, S is the LaPlace operator, and $n$ is the number of first order lags used in the exponential simulation.

In a preferred form of the invention, the described control system is operated by air pressure. For example, transmitter 43, 52, and 57 can all supply air pressure proportional to the measured properties and the adding relays and force bridges, in turn, modify and supply air pressure signals. If air pressures are used, it is necessary to provide supply air to the various components but it has not been thought necessary to shown such an air supply system since such systems are well known in the art and to show such a system here would simply complicate the drawing unnecessarily.

All of the various components, that is, the sensing elements, transmitters, adding relays, force bridges, flow controller valves, etc., are well known in the art and, therefore, details of their construction have not been shown here. For example, Taylor Transaire Pressure Transmitter No. 317RN, described in Taylor Instrument Company Brochure 2B100 of December 1952, may be used for pressure transmitter 96. Taylor Transmitter No. 317RG, also described in the above-mentioned brochure, may be used for temperature transmitters 99, 94, 64, and 78. The Taylor Transet Potentiometer Transmitter No. 700T, described in Taylor Instrument Company Brochure 2B300 of February 1957, may be used for temperature transmitter 106.

Adding relays 67, 76, 97, 108 and 101 may consist of the Foxboro Model 56 Computing Relay, described in Catalog 37–A–57a, September 12, 1956, of the Foxboro Company. The Sorteberg Force Bridge, described in Catalog C80–1–5M, December 1956, of the Minneapolis-Honeywell Company, may be used for force bridges 61, 62, 71, 72, 73, 86, 87, etc. Foxboro Model M/40 Controller, described in Bulletin 5A–10A, November 1955, of the Foxboro Company, may be used for controllers 44, 53, 58, and 68. A suitable throttling calorimeter for use as a component 93 is that described on page 31 of the textbook entitled "Elements of Steam and Gas Power Engineering" by Potter and Calderwood, McGraw-Hill Book Company, 1920.

A specific example of this invention will now be described in connection with the preferred embodiment illustrated in FIGURE 2. In this example, a 50/50 feed mixture of n-butane and isobutane, having an average specific heat of 0.425 B.t.u./lb.$\times°$ F., is fed at the rate of 10,000 lbs./hr. and at a temperature of 80° F. through economizer 13. In economizer 13, the feed is heat exchanged with bottoms product withdrawn via line 39 from fractionator 11 at 177° F., the average specific heat of the bottoms product being 0.42 B.t.u./lb.$\times°$ F. and the flow rate of the bottoms product being 5,000 lbs./hr. of 99% n-butane. This bottoms product leaves economizer 13 at a temperature of 100° F. This heat exchange step results in raising the temperature of the feed to 118° F. The partially heated, liquid feed then enters preheater 14 where it is heat exchanged with steam at 213° F. supplied via line 48 at 804 lbs./hr. The difference in enthalpy of the steam entering the preheater and the condensate is 969.7 B.t.u./lb. of steam, the temperature of the condensate (water) being 213° F. The resulting half-vaporized feed is introduced into fractionator 11 at 165° F. Fractionator 11 is operated at 150 p.s.i.a., and yields 5,000 lbs./hr. of 99% isobutane overhead at a temperature of 154° F.

The various temperatures, flow rates, and constants are measured in the manner described hereinbefore in connection with FIGURE 2, and the following equation is solved:

$H_T = 0.425(80-100) + (804/10,000)969.7$
$\qquad + (5,000/10,000)(0.42)(177-100)$
$H_T = -8.5 + 77.8 + 16.2$
$H_T = 85.5$ B.t.u./lb. of feed with reference to 100° F.

Assuming that it is desired to maintain the enthalpy of the feed introduced into the fractionator at 85.5 B.t.u./lb. of feed, this desired value is introduced as a set point 75 into enthalpy recorder controller 68. The above-computed feed enthalpy value, 85.5 B.t.u./lb. of feed, is fed as an output signal from adder 76 to the enthalpy recorder controller 68, and comparison of the computed enthalpy value with the desired enthalpy value indicates these values are equal. Thus, the amount of steam flow to the preheater 14 is exactly that which is necessary to maintain the desired enthalpy value of the feed introduced in the fractionator, and no process change is made. However, if the computation of the enthalpy of the feed, as determined in adder 76, is less than the desired value, i.e., less than 85.5 B.t.u./lb. of feed, the enthalpy recorder controller 68 accordingly manipulates the set point of the flow recorder controller 53 so as to open valve 54 in steam line 48 and increase the flow of steam to the preheater 14, in order to increase the heat given up by the preheater to the feed and maintain the desired enthalpy value. On the other hand, if the computed enthalpy value, transmitted as an output signal by adder 76 to enthalpy recorder controller 68, is more than the desired value, the enthalpy recorder controller will manipulate the set point of flow recorder controller 53 and accordingly decrease the flow of steam via line 48 to the preheater 14 in order to decrease the heat given up in the preheater to the feed, again thereby maintaining the desired enthalpy flow of the feed introduced into the fractionator.

Various modifications and alterations of this invention will become apparent to those skilled in the art without departing from the scope and spirit of this invention, and it should be understood that the foregoing discussion and drawing should not be construed to limit unduly the subject invention.

We claim:

1. In a fractionation process where a liquid process stream is first indirectly heat exchanged with bottoms product from a fractionation step, the resulting heated liquid process stream is then indirectly heat exchanged with steam in a second indirect heat exchange step, and the resulting partially vaporized process stream is passed as feed to said fractionation step, the method of computing and controlling the enthalpy, relative to a predetermined base reference temperature, of said feed, comprising the steps of measuring the flow rate of said process stream in its liquid state and producing, responsive thereto, a first signal proportional to the flow rate of the process stream, measuring the flow rate of said steam and producing, responsive thereto, a signal proportional to the flow rate of said steam, automatically dividing said second signal by said first signal and multiplying the resulting quotient by a signal proportional to the difference betwen the enthalpy of said steam and the enthalpy of the resulting liquid condensate of said steam, and thereby producing, responsive thereto, a third signal proportional to the enthalpy given by said steam to said process stream in said second heat exchange step, measuring the temperature of said heated liquid process stream and producing, responsive thereto, a fourth signal proportional to the temperature of said liquid process stream, automatically subtracting from said fourth signal a signal proportional to said predetermined base reference temperature, automatically multiplying the resulting remainder by a signal proportional to the average specific heat of the initial process stream, and thereby producing, responsive thereto, a fifth signal proportional to the enthalpy, relative to said predetermined base temperature, of said process stream after it has been heat exchanged with said bottoms product, automatically adding said third and fifth signals to produce, responsive thereto, a sixth signal proportional to the enthalpy, relative to said predetermined base temperature, of the thus heated process stream, automatically comparing said sixth signal with a seventh signal proportional to a predetermined enthalpy value relative to said predetermined base temperature, for said feed, and accordingly controlling the rate of flow of said steam to maintain the enthalpy of said feed equal to said predetermined enthalpy value.

2. In a fractionation process where a liquid process stream is first indirectly heat exchanged with bottoms product from a fractionation step, the resulting heated process stream is then indirectly heat exchanged with steam in a second indirect heat exchange step, and the resulting partially vaporized process stream is passed as feed to said fractionation step, the method of computing and controlling the enthalpy, relative to a predetermined base reference temperature, of said feed, comprising the steps of measuring the flow rate of said process stream in its liquid state and producing, responsive thereto, a first signal proportional to the flow rate of said process stream, measuring the flow rate of said steam and producing, responsive thereto, a signal proportional to the flow rate of said steam, automatically dividing second signal by said first signal and multiplying the resulting quotient by a signal proportional to the difference between the enthalpy of said steam and the enthalpy of the resulting liquid condensate of said steam, and thereby producing, responsive thereto, a third signal proportional to the enthalpy given by said steam to said process stream in said second heat exchange step, measuring the temperature of the initial process stream and producing, responsive thereto, a fourth signal proportional to the initial temperature of said process stream, automatically subtracting from said fourth signal a signal proportional to a predetermined base reference temperature, automatically multiplying the resulting remainder by a signal proportional to the average specific heat of the initial process stream, and thereby producing, responsive thereto, a fifth signal proportional to the initial enthalpy, relative to said predetermined base temperature, of said process stream, measuring the drop in temperature of said liquid heat exchange medium across said first heat exchange step and producing, responsive thereto, a sixth signal proportional to the drop in temperature of said liquid heat exchange medium, measuring the flow rate of said liquid heat exchange medium and producing, responsive thereto, a seventh signal proportional to the flow rate of said liquid heat exchange medium, automatically dividing said seventh signal by said first signal, automatically multiplying the resulting quotient by said sixth signal and a signal proportional to the average specific heat of said liquid heat exchange medium, and thereby producing, responsive thereto, an eighth signal proportional to the enthalpy given by said liquid heat exchange medium to said process stream in said first heat exchange step, automatically adding said third, fifth, and eighth signals, and thereby producing, responsive thereto, a ninth signal proportional to the enthalpy, relative to said predetermined base temperature, of the thus heated process stream, automatically comparing said ninth signal with a tenth signal proportional to a predetermined enthalpy value, relative to said predetermined base temperature, for said heated process stream, and accordingly controlling the rate of flow of said steam to maintain the enthalpy, relative to said predetermined base temperature, of said heated process stream equal to said predetermined enthalpy value.

3. In a fractionation system comprising a fractionation column, conduit means to supply said column with feed, a first indirect heat exchanger in said conduit means, a second indirect heat exchanger in said conduit means downstream of said first heat exchanger, conduit means to withdraw bottoms product from said column and supply it to said first heat exchanger, and conduit means to supply said second heat exchanger with steam, apparatus for computing and controlling the enthalpy, relative to a predetermined base reference temperature, of said feed introduced into said column, comprising in combination, control means for controlling the flow rate of steam in said last-mentioned conduit means, means to measure the flow rate of said feed in its liquid state and produce, responsive thereto, a first signal proportional to the flow rate of said feed, means to measure the flow rate of said steam and produce, responsive thereto, a second signal proportional to the flow rate of said steam, means for dividing said second signal by said first signal and multiply the resulting quotient by a signal proportional to the difference between the enthalpy of said steam and the enthalpy of the resulting liquid condensate of said steam and produce, responsive thereto, a third signal proportional to the resulting product, means to measure the temperature of said feed downstream of said first heat exchanger and upstream of said second heat exchanger and produce, responsive thereto, a signal proportional to said feed temperature, means to subtract from the last-mentioned signal a signal proportional to a predetermined base reference temperature and multiply the resulting remainder by a signal proportional to the average specific heat of the initial feed and produce, responsive thereto, a fourth signal proportional to the resulting product, means to add said third and fourth signals and produce, responsive thereto, a fifth signal proportional to the resulting sum and the enthalpy, relative to said predetermined base temperature, of the thus heated feed introduced into said column, means to compare said fifth signal with a signal proportional to a predetermined feed enthalpy relative to said predetermined base temperature and accordingly control said control means to maintain the enthalpy, relative to said predetermined base temperature, of said feed equal to said predetermined enthalpy value.

4. In a fractionation system comprising a fractionation column, conduit means to supply said column with feed, a first indirect heat exchanger in said conduit means, a second indirect heat exchanger in said conduit means downstream of said first heat exchanger, conduit means to withdraw bottoms product from said column and supply it to said first heat exchanger, and conduit means to supply said second heat exchanger with steam, apparatus for computing and controlling the enthalpy, relative to a predetermined base reference temperature, of said feed introduced into said column, comprising in combination, control means for controlling the flow rate of steam in said last-mentioned conduit means, means to measure the flow rate of said feed in its liquid state and produce, responsive thereto, a first signal proportional to the flow rate of said feed, means to measure the flow rate of said steam and produce, responsive thereto, a second signal proportional to the flow rate of said steam, means for dividing said second signal by said first signal and multiply the resulting quotient by a signal proportional to the difference between the enthalpy of said steam and the enthalpy of the resulting liquid condensate of said steam and produce, responsive thereto, a third signal proportional to the resulting product, means to measure the temperature of said feed upstream of said first heat exchanger and produce, responsive thereto, a signal proportional to the temperature of said feed, means to subtract from the last-mentioned signal a signal proportional to a predetermined base reference temperature and multiply the resulting remainder by a signal proportional to the average specific heat of the initial feed and produce, responsive thereto, a fourth signal proportional to the resulting product, means to measure the drop in temperature of said bottoms product across said first heat exchanger and produce, responsive thereto, a fifth signal proportional to the drop in temperature of said bottoms product, means to measure the flow rate of said bottoms product and produce, responsive thereto, a sixth signal proportional to the flow rate of said bottoms product, means to divide said sixth signal by said first signal and multiply the resulting quotient by said fifth signal and a signal proportional to the average specific heat of said bottoms product and thereby produce, responsive thereto, a seventh signal, means to add said third, fourth and seventh signals and produce, responsive thereto, an eighth signal proportional to the resulting sum and the enthalpy, relative to said predetermined base temperature, of the thus heated feed introduced into said column, means to compare said eighth signal with a signal proportional to the predetermined feed enthalpy relative to said predetermined base temperature, and accordingly control said control means to maintain the enthalpy of said feed equal to said predetermined enthalpy value.

5. In a fractionation system comprising a fractionation column, conduit means to supply said column with feed, a first indirect heat exchanger in said conduit means, a second indirect heat exchanger in said conduit means downstream of said first heat exchanger, conduit means to withdraw bottoms product from said column and supply it to said first heat exchanger, and conduit means to supply said second heat exchanger with steam, apparatus for computing and controlling the enthalpy, relative to a predetermined base reference temperature, of said feed introduced into said column, comprising in combination, control means for controlling the flow rate of steam in said last-mentioned conduit means, means to measure the flow rate of said feed in its liquid state and produce, responsive thereto, a first signal proportional to the flow rate of said feed, means to measure the flow rate of said steam and produce, responsive thereto, a second signal proportional to the flow rate of said steam, means for dividing said second signal by said first signal and multiply the resulting quotient by a signal proportional to the difference between the enthalpy of said steam and the enthalpy of the resulting liquid condensate of said steam and produce, responsive thereto, a third signal proportional to the resulting product, means to measure the temperature of said feed upstream of said first heat exchanger and produce, responsive thereto, a signal proportional to the temperature of said feed upstream of said first heat exchanger, means to subtract from the last-mentioned signal a signal proportional to a predetermined base reference temperature and multiply the resulting remainder by a signal proportional to the average specific heat of the initial feed and produce, responsive thereto, a fourth signal proportional to the resulting product, means to delay the transmission of the latter signal to compensate for process dead time and exponential response, means to measure the drop in temperature of said bottoms product across said first heat exchanger and produce, responsive thereto, a fifth signal proportional to the drop in temperature of said bottoms product, means to measure the flow rate of said bottoms product and produce, responsive thereto, a sixth signal proportional to the flow rate of said bottoms product, means to divide said sixth signal by said first signal and multiply the resulting quotient by said fifth signal and a signal proportional to the average specific heat of said bottoms product and thereby produce, responsive thereto, a seventh signal, means to delay the transmission of the latter signal to compensate for process dead time and exponential response, means to add said third signal, said delayed fourth signal, and said delayed seventh signal and produce, responsive thereto, an eighth signal proportional to the resulting sum and the enthalpy relative to said predetermined base temperature, of the thus heated feed introduced into said column, means to compare said eighth signal with a signal proportional to the predetermined feed enthalpy, relative to a predetermined base reference temperature, and accordingly control said control means to maintain the enthalpy, relative to said predetermined reference temperature, of said feed equal to said predetermined enthalpy value.

References Cited by the Examiner

UNITED STATES PATENTS

| | | | |
|---|---|---|---|
| 2,476,280 | 7/1949 | Bragg et al. | 202—160 |
| 2,696,465 | 12/1954 | Kittredge. | |
| 2,754,053 | 7/1956 | Howe | 202—160 |
| 2,908,761 | 10/1959 | Raisbeck | 235—181 |
| 2,936,116 | 5/1960 | Adamson et al. | 235—165 |
| 2,959,958 | 11/1960 | Savet | 235—196 |
| 2,977,289 | 3/1961 | Kron | 202—160 |
| 2,985,565 | 5/1961 | Bellinger | 202—160 |
| 2,990,437 | 6/1961 | Berger | 202—160 |
| 3,018,229 | 1/1962 | Morgan | 202—160 |
| 3,020,213 | 2/1962 | Lupfer | 202—160 |
| 3,034,718 | 5/1962 | Freitas et al. | 202—160 |
| 3,050,450 | 8/1962 | Kleiss et al. | 202—160 |
| 3,071,520 | 1/1963 | Smalling | 202—160 |
| 3,091,665 | 5/1963 | Schroeder | 235—181 |
| 3,115,445 | 12/1963 | Kleiss et al. | 202—160 |
| 3,150,064 | 9/1964 | Dobson | 202—160 |
| 3,151,044 | 9/1964 | Oglesby | 202—160 |

FOREIGN PATENTS 1,034,586  7/1953  Germany.

OTHER REFERENCES

Anisimov: "Automatic Control of Rectification Processes," Moscow, 1957, translated by Consultants Bureau Inc., N.Y. Page 26 of Translation.

Automatic Control: May 1958, volume 7–8, pp. 43–48.

Greenwood et al.: Electronic Instruments, Radiation Lab. Series, vol. 21, McGraw-Hill, 1948 (pp. 132–133).

NORMAN YUDKOFF, *Primary Examiner.*

ROBERT L. BURNETT, ALPHONSO D. SULLIVAN,
*Examiners.*

W. L. BASCOMB, M. H. SILBERSTEIN,
*Assistant Examiners.*